(12) United States Patent
Eriksson et al.

(10) Patent No.: US 8,876,934 B2
(45) Date of Patent: Nov. 4, 2014

(54) APPARATUS AND METHOD FOR ELECTROMAGNETIC STIRRING IN AN ELECTRICAL ARC FURNACE

(71) Applicants: Jan-Erik Eriksson, Vasteras (SE); Mohamed Ali Rahmani, Vasteras (SE); Ola Widlund, Hagersten (SE); Olof Hjortstam, Vasteras (SE); Rebei Bel Fdhila, Vasteras (SE); Shiva Sander-Tavallaey, Taby (SE); Ulf Sand, Vasteras (SE); Xiaojing Zhang, Vasteras (SE); Tord Kroon, Vasteras (SE)

(72) Inventors: Jan-Erik Eriksson, Vasteras (SE); Mohamed Ali Rahmani, Vasteras (SE); Ola Widlund, Hagersten (SE); Olof Hjortstam, Vasteras (SE); Rebei Bel Fdhila, Vasteras (SE); Shiva Sander-Tavallaey, Taby (SE); Ulf Sand, Vasteras (SE); Xiaojing Zhang, Vasteras (SE); Tord Kroon, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/827,033

(22) Filed: Mar. 14, 2013

(65) Prior Publication Data

US 2013/0269483 A1 Oct. 17, 2013

Related U.S. Application Data

(63) Continuation of application No. PCT/EP2010/063479, filed on Sep. 14, 2010.

(51) Int. Cl.
| | | |
|---|---|---|
| B01F 13/08 | (2006.01) | |
| C21C 5/52 | (2006.01) | |
| F27B 3/10 | (2006.01) | |
| F27D 27/00 | (2010.01) | |
| C21C 7/00 | (2006.01) | |

(52) U.S. Cl.
CPC .............. *B01F 13/0809* (2013.01); *C21C 7/00* (2013.01); *C21C 5/52* (2013.01); *F27B 3/10* (2013.01); *F27D 27/00* (2013.01)
USPC ............................ 75/10.67; 266/233; 266/234

(58) Field of Classification Search
CPC ....... B01F 13/0809; C21C 7/00; C22B 9/003; H05B 6/34; H05B 6/36; H05B 6/367
USPC ................................... 75/10.67; 266/233, 234
See application file for complete search history.

(56) References Cited

U.S. PATENT DOCUMENTS

| | | | | |
|---|---|---|---|---|
| 3,551,578 A | * | 12/1970 | Hammarlund et al. | ....... 373/146 |
| 2009/0322000 A1 | * | 12/2009 | Takahashi | ..................... 266/234 |

FOREIGN PATENT DOCUMENTS

| | | |
|---|---|---|
| CN | 201109787 Y | 9/2008 |
| CN | 201322549 Y | 10/2009 |
| JP | 59208387 A | 11/1984 |
| JP | 60191188 A | 9/1985 |
| RU | 2148291 C1 | 4/2000 |

OTHER PUBLICATIONS

International Preliminary Report on Patentability Application No. PCT/EP2010/063479 Completed: Oct. 8, 2012 9 pages.
International Search Report and Written Opinion of the International Searching Authority Application No. PCT/EP2010/063479 Completed: Oct. 8, 2010; Mailing Date: Oct. 15, 2010 9 pages.
The State Intellectual Property Office of the People's Republic of China First Office Action Issued: Dec. 4, 2013 Application No. 201080069100X 13 pages.

* cited by examiner

*Primary Examiner* — Keith Walker
*Assistant Examiner* — Alexander Polyansky
(74) *Attorney, Agent, or Firm* — St. Onge Steward Johnston & Reens LLC

(57) ABSTRACT

An apparatus for electromagnetic stirring of the steel melt in an electrical arc furnace includes two electromagnetic stirrer units, a current supply, and a control unit. The two stirrers are mounted on an outer bottom surface of the electrical arc furnace at opposites sides of a central position of the bottom surface, the current supply is operatively connected to the two electromagnetic stirrer units, and the control unit is operatively connected to the current supply to control the operation of the two electromagnetic stirrer units.

12 Claims, 3 Drawing Sheets

US 8,876,934 B2

APPARATUS AND METHOD FOR ELECTROMAGNETIC STIRRING IN AN ELECTRICAL ARC FURNACE

FIELD OF THE INVENTION

The present invention generally relates to electromagnetic stirring of the steel melt in AC or DC electrical arc furnaces.

BACKGROUND OF THE INVENTION

Electromagnetic stirring (EMS) of the steel melt in electrical arc furnaces (EAF) are beneficial of several reasons, for example to improve melt speed and reduce process time, to improve temperature homogenization, to reduce energy consumption, and to prevent vortex formation during taping.

In earlier installations of EMS's at AC EAF's, the stirrer unit is mounted below the bottom at a central position. In DC EAF's the DC current is collected in a large electrode that is integrated into the bottom refractory of the furnace. The electrode is connected to the outside through the bottom. The bottom electrode area is very large (typically 2×3 m).

Thus, in installations of EMS at DC EAF's, it is not possible to place the stirrer unit at a central position below the bottom of the furnace. Normally, no other areas which are close enough to the melt and with a sufficiently large area exist.

Further, prior art stirrer units for DC and AC EAF's seem to be inflexible and do not provide adequate stirring for all kind of applications.

SUMMARY OF THE INVENTION

It is an object of the present invention to provide an apparatus and a method, respectively, for electromagnetic stirring of the steel melt in an electrical arc furnace, which address the above issues.

It is a particular object of the invention to provide such apparatus and method, which provide for flexible stirrer positioning and use.

It is a further object of the invention to provide such apparatus and method, by which the stirring can be dynamically controlled during the EAF process cycle.

It is yet a further object of the invention to provide such apparatus and method, which are simple, robust, reliable, and of low cost.

These objects among others are, according to the present invention, attained by apparatuses and a method for electromagnetic stirring.

According to one aspect of the invention there is provided an apparatus for electromagnetic stirring of the steel melt in an electrical arc furnace comprises two electromagnetic stirrer units, at least one current supply, and a control unit. The two stirrers are mounted on an outer bottom surface of the electrical arc furnace at opposite sides of a central position of the bottom surface, the current supply is operatively connected to the two electromagnetic stirrer units, and the control unit is operatively connected to the current supply to control the operation of the two electromagnetic stirrer units. Preferably, the electrical arc furnace is a DC electrical arc furnace having a DC bottom electrode and the two electromagnetic stirrer units are mounted on opposite sides of the DC bottom electrode.

In one embodiment each of the two electromagnetic stirrer units has a core with separate coils wrapped around the core. Each of the cores may be provided with a shield, e.g. made of aluminum or other non-magnetic material, covering the bottom surface and the side surfaces of the core and placed in-between the core and the winding. Such shield reduces the electromagnetic field on the bottom surface and the side surfaces of the stirrer.

In a further embodiment of the invention each of the two electromagnetic stirrer units has a core with a winding of pancake type. Using such winding no shielding is necessitated.

In yet a further embodiment of the invention the cores has one or several bends adapted to the shape of the outer bottom surface of the electrical arc furnace. Hereby, appropriate stirring may be obtained while minimizing the energy used therefore. Further, very strong stirring forces can be obtained.

In still a further embodiment the control unit and a single current supply for the two electromagnetic stirrer units are configured to operate the two electromagnetic stirrer units as a single unit. Hereby, the current supply system can be operatively connected to the two stirrers such that the two stirrers are operated in parallel in either forward or backward direction. Alternatively, the single current supply system is operatively connected to the two stirrers such that the two stirrers are operated in opposite directions to each other giving a steel melt flow circulating along the furnace walls either clockwise or anti-clockwise. Yet alternatively, the single current supply system is configured to operate the two electromagnetic stirrer units to obtain different stirring operations and/or different stirring patterns during different phases of the EAF process cycle.

The present invention is also directed towards an electrical arc furnace, particularly a DC furnace, comprising the apparatus for electromagnetic stirring as disclosed above.

According to a further aspect of the invention there is provided a method for electromagnetic stirring of the steel melt in an electrical arc furnace. According to the method two electromagnetic stirrer units are provided mounted on an outer bottom surface of the electrical arc furnace at opposite sides of a central position of the bottom surface. At least one current supply is connected to the two electromagnetic stirrer units. Finally, the operation of the two electromagnetic stirrer units is controlled by a control unit operatively connected to the current supply.

By means of the present invention electromagnetic stirring with a sufficient strength is enabled also for DC furnaces with large bottom electrodes. The invention provides for a flexible solution with a large variety of possible operation characteristics for different applications. By the invention electromagnetic stirring is enabled while the energy consumption is reduced. Strong stirring forces are obtainable and the stirring pattern can be controlled.

Further characteristics of the invention, and advantages thereof, will be evident from the following detailed description of preferred embodiments of the present invention given hereinafter and the accompanying FIGS. 1-4, which are given by way of illustration only, and are thus not limitative of the present invention.

DETAILED DESCRIPTION OF THE INVENTION

Figure 1A:
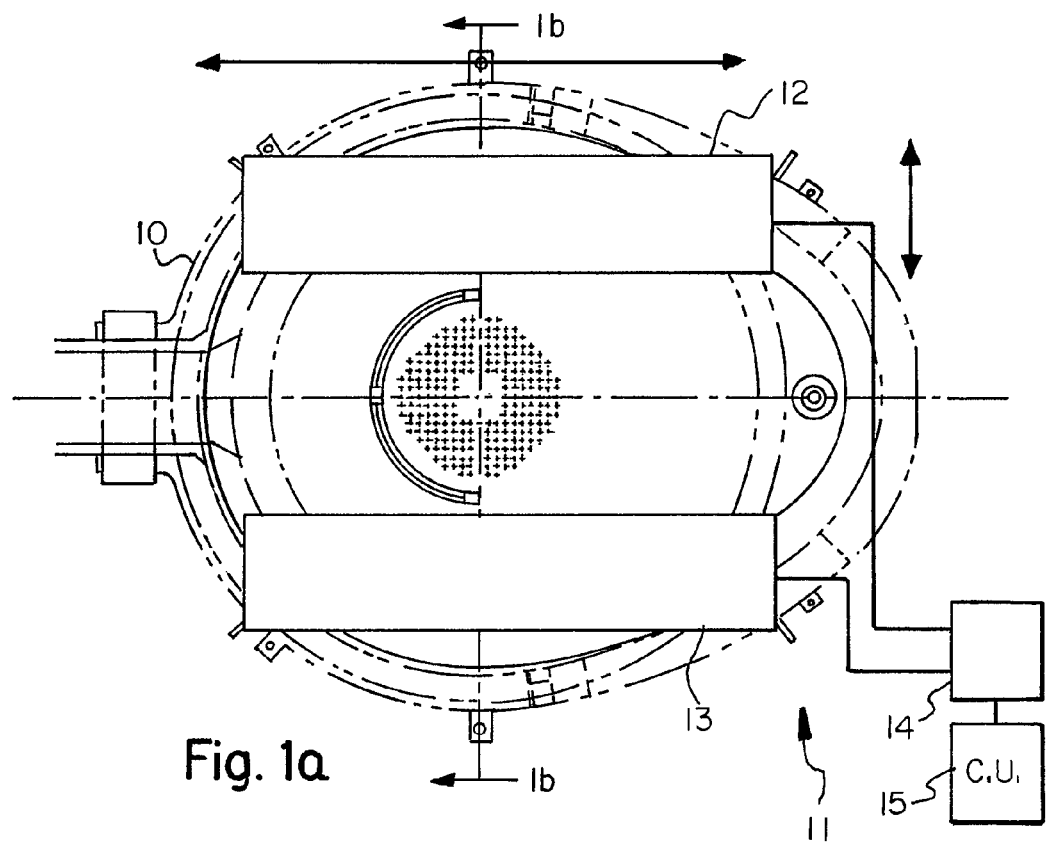
FIGS. 1a-b displays in top and side elevation views an EAF, in which an apparatus for electromagnetic stirring of the steel melt in the EAF according to one embodiment of the invention is schematically indicated.
Figure 1B:
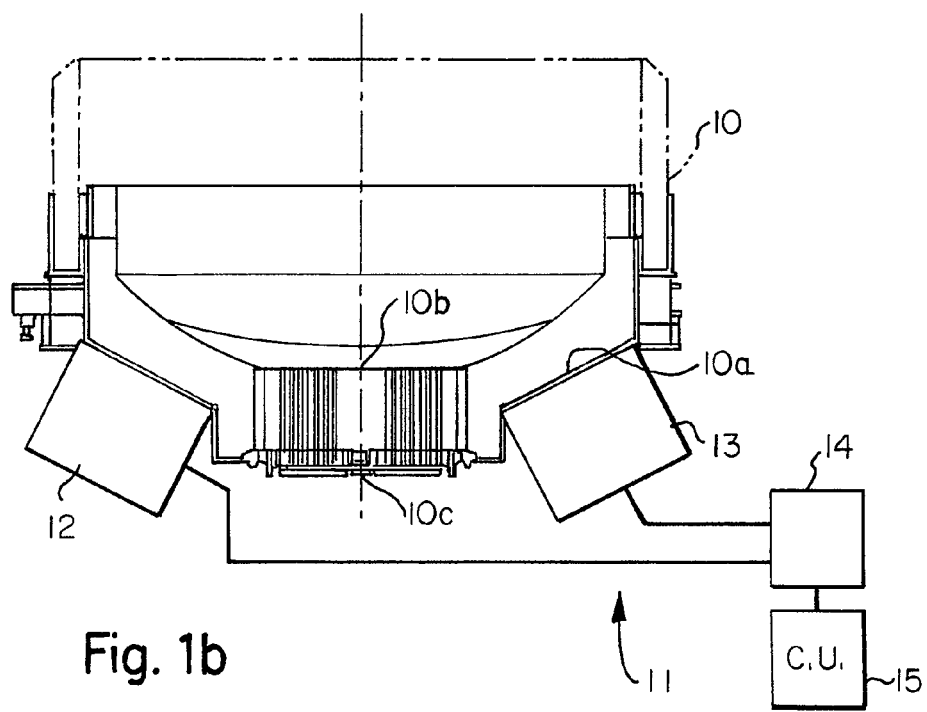

In FIGS. 1a-b is illustrated an electrical arc furnace (EAF) 10, in which an apparatus 11 for electromagnetic stirring of the steel melt in the EAF 10 according to one embodiment of the invention is implemented. The EAF may be a DC EAF as illustrated or an AC EAF.

The apparatus 11 for electromagnetic stirring comprises two electromagnetic stirrer units 12, 13, a single current supply system 14 operatively connected to the two electromagnetic stirrer units 12, 13, and a control unit 15 operatively connected to the single current supply system 14 to control the operation of the two electromagnetic stirrer units 12, 13. The two electromagnetic stirrer units 12, 13 are mounted on an outer bottom surface 10a of the EAF at opposite sides of a central position 10b of the bottom surface 10a. The DC EAF has typically a DC bottom electrode 10c located at the central position 10b of the bottom surface 10a and the two electromagnetic stirrer units are thus mounted on opposite sides of the DC bottom electrode 10c.

It shall be appreciated that the EAF may typically be made of iron and in such instance the material at the areas of the EAF where the electromagnetic stirrer units will be located has to be changed to non-magnetic material such as e.g. austenitic steel.

The single current supply system 14 may be exchanged for a plurality of current supplies, e.g. one for each electromagnetic stirrer unit.

The control unit 15 and the single current supply system 14 are preferably configured to operate the two electromagnetic stirrer units 12, 13 as a single unit. Hereby, the single current supply system 14 can be operatively connected to the two stirrers 12, 13 such that the two stirrers are operated in parallel in either forward or backward direction or are operated in opposite directions to each other giving a steel melt flow circulating along the furnace walls either clockwise or anti-clockwise.

Further, the control unit 15 and the single current supply system 14 may be configured to operate the two electromagnetic stirrer units 12, 13 to obtain different stirring operations and/or different stirring patterns during different phases of the EAF process cycle.

Figure 2:
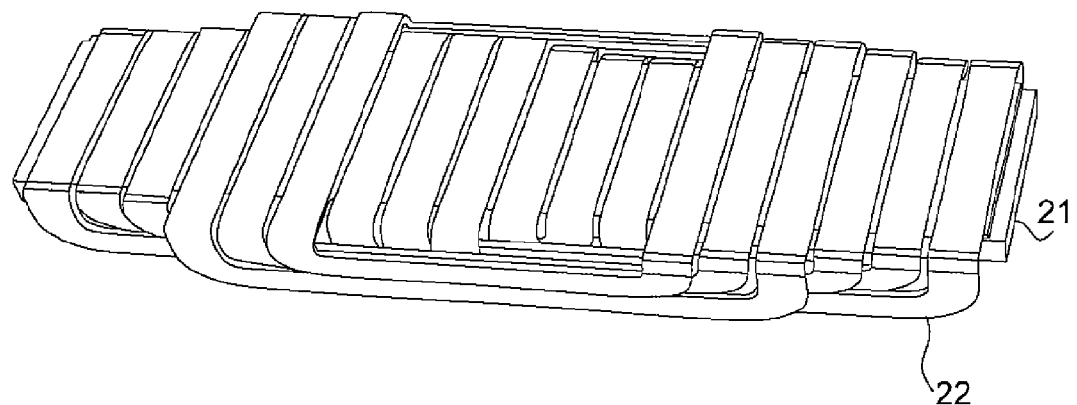
FIGS. 2-4 display in perspective views different stirrers for use in the apparatus for electromagnetic stirring schematically indicated in FIGS. 1a-b.

In FIG. 2 is illustrated an embodiment of an electromagnetic stirrer unit that can be used in the apparatus 11 for electromagnetic stirring of FIGS. 1a-b. The electromagnetic stirrer unit is a three-phase stirrer and has an iron core 21 with a winding 22 of so called pancake type. The winding 22 is not wrapped around the core but winded along three sides of the core 21. Each phase has two windings or poles which are connected such that electric current will go in opposite directions in the two windings. However, this winding design renders the electromagnetic stirrer unit much wider than the width of the iron core 21. This design seems to be less advantageous for strong stirrers in the DC EAF due to the limited space available at the sides of the DC bottom electrode.

Figure 3:
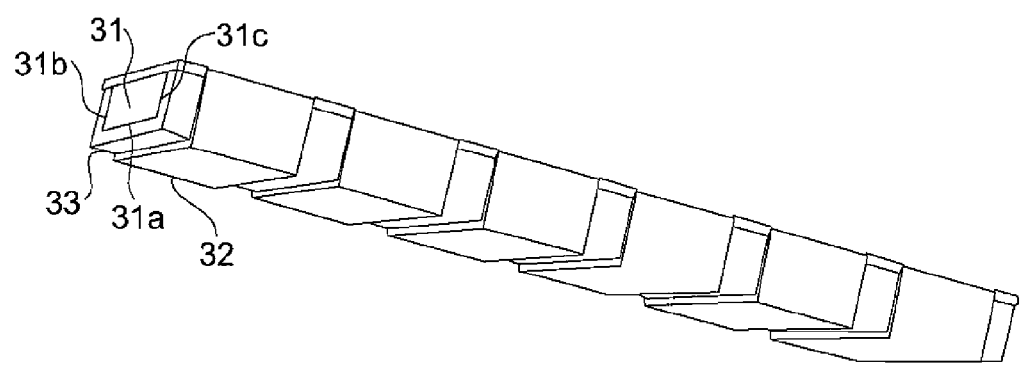

In FIG. 3 is illustrated an alternative embodiment of an electromagnetic stirrer unit that can be used in the apparatus 11 for electromagnetic stirring of FIGS. 1a-b. The electromagnetic stirrer unit is a three-phase stirrer and has an iron core 31 with separate coils 32 wrapped around the core. Each phase has two windings or poles which are connected such that electric current will go in opposite directions in the two windings. By this design the width of the electromagnetic stirrer unit will be only slightly larger than the width of the iron core 31 and manufacturing is simplified. A potential drawback of this design is that the iron core 31 has to be heavier, typically about twice as heavy as the iron core of FIG. 2, for instance 40 tons instead of 20 tons. Furthermore, this design needs a larger electrical power input for a given stirring force. To this end, the electromagnetic stirrer unit has also preferably a shield 33 covering the bottom surface 31a and the side surfaces 31b, 31c of the core (i.e. all sides but the side facing the EAF) and is placed in-between the core 31 and the coils 32. The shield can be made of aluminum or other suitable material such as copper and reduces the electromagnetic field on the bottom surface 31a and the side surfaces 31b, 31c of the electromagnetic stirrer unit, thereby rendering the electromagnetic stirrer unit more energy efficient. The weight of the iron core 31 can further be reduced.

Figure 4:
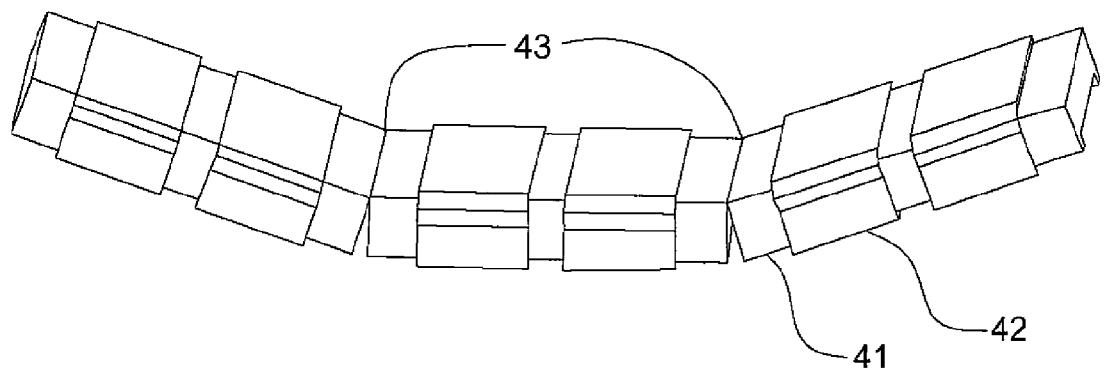

In FIG. 4 is illustrated yet an alternative embodiment of an electromagnetic stirrer unit that can be used in the apparatus 11 for electromagnetic stirring of FIGS. 1a-b. The electromagnetic stirrer unit comprises a core 41 and a winding 42 and can be based on either one of the types of FIGS. 2 and 3. However, the core 41 has one or several bends 43 adapted to the shape of the outer bottom surface 10a of the EAF 10. Hereby the electromagnetic stirrer unit can be place closer to the EAF 10 and can thus provide stronger stirring forces and/or be made more energy efficient. The bent design is particularly suitable for the FIG. 3 type of magnetic stirrer.

It shall be appreciated that the present invention is also related to EAF's such as DC and AC EAF's comprising the apparatus 11 for electromagnetic stirring as disclosed above.

What is claimed is:

1. An apparatus for electromagnetic stirring of steel melt in an electrical arc furnace, comprising:
    two electromagnetic stirrer units mounted on an outer bottom surface of said electrical arc furnace at opposites sides of a central position of said bottom surface; and
    at least one current supply operatively connected to said two electromagnetic stirrer units; and
    a control unit operatively connected to the current supply to control the operation of the two electromagnetic stirrer units, wherein the two electromagnetic stirrer units have each a core with separate coils wrapped around the core, characterized in that
    the two electromagnetic stirrer units have each a shield covering a bottom surface and side surfaces of the core placed in-between the core and a winding, the shield reduces the electromagnetic field on the bottom surface and the side surfaces of the stirrer.

2. The apparatus of claim 1 wherein a single current supply is operatively connected to said two electromagnetic stirrer units.

3. The apparatus of claim 1 wherein the electrical arc furnace is a DC electrical arc furnace having a DC bottom electrode and the two electromagnetic stirrer units are mounted on opposite sides of the DC bottom electrode.

4. The apparatus of claim 1 wherein each of the shields is made of aluminum.

5. The apparatus of claim 1 wherein each of the cores has one or several bends adapted to the shape of the outer bottom surface of the electrical arc furnace.

6. The apparatus of claim 1 wherein the control unit and the current supply are configured to operate the two electromagnetic stirrer units as a single unit.

7. The apparatus of claim 6 wherein the single current supply system is operatively connected to the two stirrers such that the two stirrers are operated in parallel in either forward or backward direction.

8. The apparatus of claim 6 wherein the current supply is operatively connected to the two stirrers such that the two stirrers are operated in opposite directions to each other giving a steel melt flow circulating along the furnace walls either clockwise or anti-clockwise.

9. The apparatus of claim 1 wherein the control unit and the current supply are configured to operate the two electromagnetic stirrer units to obtain different stirring patterns during the operation of the electrical arc furnace.

10. An electrical arc furnace comprising the apparatus for electromagnetic stirring of claim 1.

11. The electrical arc furnace of claim 10 wherein the electric arc furnace is a DC electric arc furnace.

12. A method for electromagnetic stirring of steel melt in an electrical arc furnace, comprising:
- providing two electromagnetic stirrer units mounted on an outer bottom surface of said electrical arc furnace at opposites sides of a central position of said bottom surface, wherein the two electromagnetic stirrer units have each a core with separate coils wrapped around the core; and
- connecting at least one current supply to said two electromagnetic stirrer units; and
- controlling the operation of the two electromagnetic stirrer units by a control unit operatively connected to the current supply, characterized by the step of:
- providing each of the two electromagnetic stirrer units with a shield covering a bottom surface and side surfaces of the core and placed in-between the core and a winding, the shield reduces the electromagnetic field on the bottom surface and the side surfaces of the stirrer.

* * * * *